US005198080A

United States Patent [19]
Cowley et al.

[11] Patent Number: 5,198,080
[45] Date of Patent: Mar. 30, 1993

[54] ELECTROCHEMICAL PROCESSING OF AQUEOUS SOLUTIONS

[75] Inventors: Gerald Cowley, Mississauga; Marek Lipsztajn, Rexdale; Zbigniew Twardowski, Mississauga; Richard Swindells, Caledon; Edward J. Bechberger, Etobicoke, all of Canada

[73] Assignee: Tenneco Canada Inc., Islington, Canada

[21] Appl. No.: 687,741

[22] Filed: Apr. 19, 1991

Related U.S. Application Data

[63] Continuation-in-part of Ser. No. 535,165, Jun. 8, 1990, Pat. No. 5,122,240.

[51] Int. Cl.$^5$ .............. C25B 1/16; C25B 1/22; C25B 1/26
[52] U.S. Cl. ................ 204/101; 204/95; 204/98
[58] Field of Search .............. 204/95, 98, 101, 104; 423/478

[56] References Cited

U.S. PATENT DOCUMENTS

| | | | |
|---|---|---|---|
| 2,376,935 | 5/1945 | Persson | 423/478 |
| 3,864,456 | 2/1975 | Winfield et al. | 423/478 |
| 4,024,043 | 5/1977 | Dege et al. | 204/296 |
| 4,057,481 | 11/1977 | Lee et al. | 204/296 |
| 4,081,520 | 3/1978 | Swindells et al. | 423/478 |
| 4,115,217 | 9/1978 | Larsson et al. | 204/95 |
| 4,116,889 | 9/1978 | Chlanda et al. | 521/27 |
| 4,129,484 | 12/1978 | Larsson | 204/101 |
| 4,180,815 | 12/1979 | Hill | 343/6.5 R |
| 4,253,900 | 3/1981 | Dege et al. | 156/309.3 |
| 4,355,116 | 10/1982 | Lee et al. | 521/27 |
| 4,465,658 | 8/1984 | Fredette | 423/478 |
| 4,473,540 | 9/1984 | Fredette | 423/479 |
| 4,584,246 | 4/1986 | Liu et al. | 428/522 |
| 4,627,969 | 12/1986 | Fredette et al. | 423/478 |
| 4,673,454 | 6/1987 | Liu et al. | 156/281 |
| 4,678,655 | 7/1987 | Twardowski | 423/478 |
| 4,806,215 | 2/1989 | Twardowski | 204/101 |

Primary Examiner—John Niebling
Assistant Examiner—Brian M. Bolam
Attorney, Agent, or Firm—Sim & McBurney

[57] ABSTRACT

The formation of sodium sulfate by-product in sulfuric acid-based chlorine dioxide generating processes is decreased and preferably eliminated entirely, by effecting electrochemical treatment of sodium ion-containing feed materials for the generator to remove sodium ions and to add hydrogen ions. Sodium hydroxide may be produced as a by-product. The process is generally applicable to the electrochemical treatment of alkali metal chlorates, alkali metal sulfates and mixtures thereof to produce acidified solutions useful in providing chlorate ion-containing feeds to such chlorine dioxide generating processes or for other purposes.

76 Claims, 3 Drawing Sheets

ELECTROCHEMICAL PROCESSING OF AQUEOUS SOLUTIONS

REFERENCE TO RELATED APPLICATION

This application is a continuation-in-part of copending U.S. patent application Ser. No. 535,165 filed Jun. 8, 1990 now U.S. Pat. No. 5,122,240.

FIELD OF INVENTION

The present invention relates to the electrochemical processing of aqueous solutions to produce acidic media for a plurality of applications, in particular in the production of chlorine dioxide.

BACKGROUND TO THE INVENTION

Chlorine dioxide, useful as a pulp mill bleaching agent, is produced chemically by reduction of an acid aqueous chlorate solution in accordance with the equation:

$$ClO_3^- + 2H^+ + e^- \rightarrow ClO_2 + H_2O$$

where the electron $e^-$ is supplied by various reducing agents, for example, methanol, chloride ion and hydrogen peroxide. In many commercial processes for effecting this reaction, the acidity for the process is provided by sulfuric acid while the chlorate ions are provided by sodium chlorate. The presence of these species leads to the formation of some form of sodium sulfate as a by-product.

One particular embodiment of a commercial process is the so-called "R8" process of the assignee of this application, as described in U.S. Pat. No. 4,081,520, assigned to the assignee herein and the disclosure of which is incorporated herein by reference. Improvements in and modifications to that process also are described in the assignee's U.S. Pat. Nos. 4,465,658, 4,473,540 and 4,627,969, the disclosures of which are incorporated herein by reference.

In that chlorine dioxide generating process, the reaction medium is at a high total acid normality of sulfuric acid and is maintained at its boiling point under a subatmospheric pressure applied thereto. Methanol is used as a reducing agent for chlorate ions, resulting in the formation of chlorine dioxide in a substantially pure form. The boiling nature of the reaction medium produces steam which acts as a diluent for the gaseous chlorine dioxide, so as to prevent decomposition of the chlorine dioxide.

The sodium sulfate by-product builds up in the reaction medium after start-up until the solution is saturated with sodium sulfate, whereupon the sodium sulfate precipitates from the reaction medium. A slurry of the sodium sulfate is removed from the reaction vessel, the crystalline sodium sulfate is filtered therefrom and the mother liquor is recycled to the reaction zone after the addition of make-up quantities of sodium chlorate, sulfuric acid and methanol.

This process is highly efficient and rapidly produces chlorine dioxide in commercial quantities. As may be concluded from the above equation, for each mole of chlorine dioxide produced a mole of chlorate ion and hence of sodium ion is introduced to the reaction medium. The sodium ions combine with the sulfate ions introduced with the sulfuric acid, to produce a sodium sulfate, which may be sodium bisulfate or, more normally under the conditions of an R-8 process, the double salt sodium sesquisulfate, i.e., $Na_3H(SO_4)_2$ (or $NaHSO_4 \cdot Na_2SO_4$), depending on the acidity of the solution.

Another sulfuric acid-based chlorine dioxide generating process, a low acidity "R3" process, as described in U.S. Pat. No. 3,864,456, the disclosure of which is incorporated herein by reference, produces neutral sodium sulfate as the by-product.

Such by-product sodium sulfate and sodium sesquisulfate (sometimes termed "saltcake"), generally have been employed to make up sulfur losses in the pulp mill. However, the adoption of high substitution of chlorine by chlorine dioxide in the chlorination stage of the bleach plant has led to saltcake by-product production from the chlorine dioxide generating process exceeding the mill make-up requirements.

There exists a need, therefore, for a chlorine dioxide generating process which possesses the attributes of, for example, the R8 process, while, at the same time, producing less sodium sulfate by-product for the same level of production of chlorine dioxide. It is even more advantageous if, in addition to a lower saltcake production, caustic soda solution is co-produced together with $ClO_2$, thus minimizing an $NaOH/Cl_2$ imbalance presently existing in pulp mills.

It has previously been suggested in U.S. Pat. No. 4,129,484 to treat aqueous effluent from chlorine dioxide generating processes electrolytically to form an acid-enriched fraction from the original solution, which then may be recycled to the chlorine dioxide generator.

In order to utilize the by-product saltcake, it was proposed in the prior art to employ an electrochemical process to convert sodium sulfate into sulfuric acid and caustic soda solution in a three-compartment electrolytic cell, equipped with a cation-exchange membrane facing the cathode and an anionic membrane or a diaphragm facing the anode, wherein the saltcake solution is fed to the middle compartment. In an electric field, sodium and sulfate or hydrogen sulfate ions are transferred to the cathodic and anodic compartments respectively where they recombine with electrolytically-generated hydroxyl and hydrogen ions to form caustic soda and sulfuric acid, respectively.

Analogously, in a simplified process, a two-compartment electrolytic cell equipped with a cation exchange membrane was proposed to generate a mixture of sulfate and sulfuric acid in an anodic compartment along with caustic soda solution in the cathodic compartment.

The main drawback of these prior proposals was that the sulfuric acid solution produced had a low acid strength (less than 10 wt % $H_2SO_4$), which imposes an excessive evaporative load on the chlorine dioxide generator, thereby rendering the process uneconomical and impractical.

Although higher sulfuric acid concentrations can be achieved in the electrochemical splitting of saltcake in the manner described in the prior art, the current efficiency for such a process is prohibitively low due to the leakage of $H^+$ ions through the ion-exchange membrane. Such migration of hydrogen ions towards the cathode is related to a very high mobility of this ion relative to $Na^+$ ions.

For example, in the aforementioned U.S. Pat. No. 4,129,484, current efficiencies as low as 9% for production of about 1 normal caustic soda solution and 39% for production of about 2M sulfuric acid were reported.

In a similar process, described in U.S. Pat. No. 4,115,217, such electrochemical processing of sodium sulfate may be combined with electrochemical production of sodium chlorite in a cathode compartment by electroreduction of chlorine dioxide.

SUMMARY OF INVENTION

In order to counteract the undesired migration of hydrogen ions towards the cathode and hence maximize the current efficiency for an acidification process, the electrolytic process is effected, in accordance with the invention, while maintaining a high concentration ratio of $Na^+/H^+$ in the anolyte.

In one embodiment of the present invention, there is provided an electrochemical process for the treatment of sodium sulfate/sodium chlorate mixtures, so as to acidify the same and provide acid for the chlorine dioxide generating process, while coproducing aqueous sodium hydroxide solution. Although the co-production of aqueous sodium hydroxide solution is most desired for the pulp mill applications, any other suitable cathodic reactions, for example, an electroreduction of oxygen to hydrogen peroxide and sodium hydroxide and others described below, can be carried out in combination with the anodic acidification of the salt mixtures.

The process of the invention is more widely applicable than to the treatment of such mixtures. Rather the invention is broadly directed to the treatment of aqueous solutions of certain alkali metal salts and mixtures thereof to form an aqueous acidified medium.

In one aspect, the present invention is broadly directed to a method for the production of an aqueous acidified chlorate ion-containing solution which is useful as a feed stream for a chlorine dioxide generating process or for other purposes wherein chlorate ions are reduced to chlorine dioxide in an aqueous acid medium.

An aqueous solution of at least one alkali metal salt selected from the group consisting of alkali metal chlorate, alkali metal sulfate and mixtures of alkali metal chlorate and alkali metal sulfate is electrochemically acidified.

Alkali metal ions are electrochemically removed from the aqueous solution to produce an acidified alkali metal salt solution which constitutes the aqueous acidified chlorate ion-containing solution when the alkali metal salt is selected from the group consisting of alkali metal chlorate and mixtures of alkali metal chlorate and alkali metal sulfate.

When the alkali metal salt is alkali metal sulfate, alkali metal chlorate is added to the acidified alkali metal salt solution to provide the aqueous acidified chlorate ion-containing solution.

One manner of effecting the procedure employs an electrolytic cell comprising a cation-exchange membrane dividing the cell into an anode compartment and a cathode compartment. The aqueous solution of at least one alkali metal salt is fed to the anode compartment and hydrogen ions are electrolytically produced in the anode compartment while alkali metal ions are transferred from the anode compartment through the cation-exchange membrane to the cathode compartment. The acidified alkali metal salt solution is removed from the anode compartment.

Alternatively, any other oxidation reaction producing hydrogen ions, for example, hydrogen gas oxidation to hydrogen ions, may be employed as an anodic reaction. Such anodic hydrogen gas oxidation may be combined with oxygen gas electroreduction as a cathodic reaction, to provide a fuel cell operation wherein, in addition to acidification of anolyte and production of alkali metal hydroxide solution in the catholyte, electrical energy is generated.

When an anodic oxidation of hydrogen gas to hydrogen ions is combined with a cathodic reduction of water to hydroxyl ions and hydrogen gas, the latter gas may be used as an anodic feed and, at the same time, a substantial energy savings may be achieved, as a result of the difference in electrochemical reaction potentials. Similarly, an analogous energy and material savings is achieved when an anodic oxidation of water to hydrogen ions and oxygen is combined with cathodic reduction of the oxygen gas stream.

In accordance with one embodiment of the present invention, there is provided an electrochemical process for the treatment of an aqueous solution of alkali metal salt mixtures, which comprises a plurality of steps. The aqueous solution is fed to the anode compartment of an electrolytic cell having a cation-exchange membrane dividing the cell into an anode compartment and a cathode compartment.

Hydrogen ions are electrolytically produced in the anode compartment and hydroxyl ions are electrolytically produced in the cathode compartment. Simultaneously alkali metal cations are transferred across the cation-exchange membrane from the anode compartment to the cathode compartment.

This migration of alkali metal cations and the electrochemical reaction producing hydrogen ions and hydroxyl ions have the effect of producing an alkali metal hydroxide solution in the cathode compartment and an acid of the anion of the alkali metal salts in the anode compartment. The respective aqueous solutions are removed from the compartments of the cell.

In order to achieve high current efficiencies of at least about 70%, preferably at least about 80%, and thereby provide an economic process, the molar ratio of $[Na^+]:[H^+]$ in the anolyte generally varies from about 1000:1 to about 1:5, preferably about 1000:1 to about 1:2, throughout the electrolytic reaction. In a preferred aspect of the invention, an improved current efficiency is achieved by controlling hydroxyl ion back-migration from the cathode compartment through the cation-exchange membrane to the anode compartment.

In another aspect of the present invention, the method for the production of aqueous acidified chlorate ion-containing solution is integrated into a chlorine dioxide generating process by providing an aqueous acid chlorine dioxide-generating reaction medium containing sulfuric acid and alkali metal ions in a reaction zone, feeding the aqueous acidified chlorate ion-containing solution to the reaction zone to provide chlorate ion and hydrogen ion reactants to the aqueous acid chlorine dioxide-generating reaction medium, and recovering an alkali metal sulfate from the reaction zone.

GENERAL DESCRIPTION OF INVENTION

As noted above, the present invention is directed generally to the electrochemical treatment of aqueous solutions of alkali metal salts and mixtures thereof to generate an aqueous acidified medium. The procedure of the present invention is particularly useful in sulfuric acid-based chlorine dioxide generating processes, since the invention enables the quantity of by-product alkali metal sulfate co-produced with the chlorine dioxide to be decreased and even eliminated entirely, while maintaining the same level of chlorine dioxide production.

In one embodiment of the present invention, an aqueous solution of at least one alkali metal salt which is alkali metal chlorate, alkali metal sulfate or, preferably, mixtures thereof is introduced to the anode compartment of a cation-exchange membrane divided electrochemical cell and alkali metal ions are transferred from the anode compartment to the cathode compartment. This procedure may be used in the present invention in different ways to achieve the decreased alkali metal sulfate output in a chlorine dioxide generating process. It is usual for chlorine dioxide generating processes to employ sodium salts, and hence in the following description of specific embodiments of the invention reference will be made to those sodium salts. However, it is apparent that the principles of the invention are applicable to salts of other alkali metals.

In a preferred embodiment of the invention, a combination of sodium chlorate and sodium sulfate, particularly in the form of sodium sesquisulfate, is fed to the anode compartment of the cell, since the presence of both salts enables the [Na+]/[H+] molar ratio in the anode compartment to be maximized, resulting in a high current efficiency and thereby lower power consumption. In addition, a higher overall current efficiency decreases the capital cost, since a lesser number of cells is required for the same production rate.

It is preferred to employ a saturated feed solution or a slurry, in order to minimize the resistance of the electrolyte, while maintaining a high [Na+]/[H+] ratio in the anode compartment. When the feed is in the form of a slurry, it usually is preferred to provide an additional separator or separators, such as an ion-exchange membrane or a diaphragm, between the feed stream and the anode to prevent abrasion and wear on the anode from occurring.

Such additional separator also may be employed, if desired, when the feed does not comprise a slurry. Such an arrangement is useful when employing sulfuric acid circulated in the anode compartment and a DSA-O$_2$ ® anode, since such anodes exhibit a longer life than when contacting mixtures of sulfuric acid and sodium sulfate.

The cell produces an acidified solution from the mixed sodium chlorate/sodium sulfate feed in the anode compartment and a sodium hydroxide solution in the cathode compartment. The acidified solution then is fed to the chlorine dioxide generating process as an acid and chlorate source therefor.

When there is no need for the saltcake in particular pulp mill, it is preferred to operate the cell so as to remove from the mixed sodium chlorate/sodium sulfate feed a quantity of sodium ions corresponding to the quantity of sodium ions introduced with the sodium chlorate. The requirements of the chlorine dioxide generator for acid and chlorate thereby are completely satisfied, so that no additional sodium sulfate by-product is formed. Therefore, in effect, a dead load of sodium sulfate cycles between the chlorine dioxide generator and the cell.

When operating the process of the invention with sodium chlorate/sodium sulfate mixtures, it is preferred to dissolve sodium chlorate in the sodium sulfate solution. Alternatively, the sodium sulfate, in slurry or crystalline form, may be added to an aqueous sodium chlorate solution or, if desired, aqueous solutions of sodium sulfate and sodium chlorate may be mixed in any required proportion.

The composition of the anolyte feed may be prepared by a one-time mixing of the individual components, namely sodium sulfate and sodium chlorate, or by a gradual addition of one component to another in the course of electrolysis. For example, sodium sulfate can be pre-acidified in an electrolytic cell prior to the addition of sodium chlorate. In fact, the process can be carried out in such a way that neutral sodium sulfate or sodium sesquisulfate is acidified to bisulfite, NaHSO$_4$, and then this solution is used to dissolve sodium chlorate, in order to take advantage of an increased solubility of bisulfate with respect to other sulfates. The mixture can be forwarded to the generator or further acidified in an electrolytic cell.

From this discussion, it will be apparent that any combination of sodium sulfate and sodium chlorate may be selected to meet the requirements of a particular pulp mill. Production of sodium sulfate by-product may be permitted at any level desired by the pulp mill.

The presence of sodium sulfate (sesquisulfate) in the anolyte improves the [Na+]/[H+] ratio not only due to an increase in sodium ion concentration but also as a result of a buffering action of the sulfate ions, which tend to recombine with hydrogen ions to form bisulfate, thereby decreasing the concentration of free hydrogen ions. In addition, a combined acidified chlorate/sulfate feed effectively decreases the amount of water introduced to the chlorine dioxide generator, as a result of a water "sharing" effect.

While operating the process using sodium chlorate/sodium sulfate mixtures provides a practically unlimited flexibility in selecting the extent of production of a by-product saltcake corresponding to between 0 to 100% recycling of sulfate, it also is possible to achieve a partial decrease in saltcake production by electrolytically acidifying a pure sodium chlorate feed solution, i.e. without any addition of sulfate. The overall reaction for such a process may be depicted as:

$$xNaClO_3 + 3H_2O \rightarrow (x-2)NaClO_3 + 2HClO_3 + 2NaOH + \tfrac{1}{2}O_2 + H_2$$

Such a partial acidification of sodium chlorate leads to a mixture of sodium chlorate and chloric acid, in which the content of chloric acid determines the extent of reduction in sulfuric acid addition to the chlorine dioxide generator and, consequently, the production of sodium sulfate by-product. Alternatively, the acidified sodium chlorate solution may be used as a pH control medium in an electrolytic chlorate cell.

Since the [Na+]/[H+] ratio constitutes a determining factor for the current efficiency of the acidification process, only partial conversion of sodium chlorate into chloric acid is feasible in this case. Usually, up to about a 20% reduction in saltcake by-product production can be achieved by acidification of a pure sodium chlorate feed at practical current efficiencies.

The aqueous sodium hydroxide solution which is co-produced in one embodiment of the present invention is readily used by the pulp mill in its bleach plant operations for the purification of bleached pulp. When pulp mills have an on-site electrolytic process for producing aqueous sodium hydroxide, usually from sodium chloride, Such process results in the co-production of chlorine. The ability to utilize such co-produced chlorine, however, is often limited, which leads to a caustic/chlorine imbalance in the pulp mill. By utilizing this embodiment of the process of the invention, not only is the problem of co-production of excess sodium sulfate in the chlorine dioxide generation process overcome, but also the problem of co-production of chlorine in sodium hydroxide production is overcome. The concentration of sodium hydroxide solution produced in the cathode compartment may be adjusted to any reasonable level, by adjusting flow rates and recycling product solution.

As noted above, the current efficiency of the process is largely dependent on the $[Na^+]/[H^+]$ ratio in the anode compartment, which usually requires a deadload of sodium ion cycling between the cell and the chlorine dioxide generator which, in the embodiment disclosed above, may be provided by sodium sulfate as the deadload. However, any other sodium salt which does not otherwise adversely affect the production of chlorine dioxide may be employed.

It has been observed that current efficiencies which can be achieved using a cation-exchange membrane divided cell in which sodium hydroxide is produced in the cathode compartment generally do not exceed approximately 80 to 85%. In accordance with one preferred embodiment of the invention, this current efficiency is increased, to greater than about 85%, by minimizing the back-migration of hydroxyl ions from the cathode compartment through the cation-exchange membrane to the acidified solution.

This result may be achieved in a variety of procedures. In one procedure, in a two-compartment cell, a less alkaline catholyte is provided. For example, sodium acid sulfate, usually sodium sesquisulfate, produced by the chlorine dioxide generation operation may be neutralized in the cathode compartment of the cell. The sodium acid sulfate neutralized in this way generally is that proportion of the sodium acid sulfate by-product removed from the chlorine dioxide generator which is intended to be used as a make-up for sulfur losses in the pulp mill or for disposal. Another advantage of the use of sodium acid sulfate in the cathode compartment is that a lower cell voltage can be employed, as a result of the dependence of potential on pH.

Another example of a less alkaline catholyte to minimize back migration of hydroxyl ions is to employ a catholyte in the form of sodium hydroxide solution of low strength.

In addition to improving current efficiency, the employment of a less alkaline catholyte also decreases the negative effect of hardness on membrane life. The effect of hardness also can be minimized by adding a carbonate, such as sodium carbonate, to the cathodic compartment. Both calcium and magnesium carbonates are less soluble than the corresponding hydroxides, and hence their presence lowers the concentration of calcium and magnesium ions, the principal causes of hardness, in the catholyte and minimizes the formation of insoluble hydroxides in the membrane.

The less alkaline catholyte also may be provided by employing a different electrochemical reaction than sodium hydroxide production. One such reaction is the electrosynthesis of dithionite by the electroreduction of bisulfite in the cathode compartment. Another such reaction is the electrosynthesis of sodium chlorite by electroreduction of chlorine dioxide in the cathode compartment.

In another procedure to minimize back-migration of hydroxyl ions, in a three-compartment cell, a buffering electrolyte is provided in the centre compartment. For example, a sodium acid sulfate, usually sodium sesquisulfate, produced by the chlorine dioxide generation operation may be provided as an electrolyte in the centre compartment. The sodium acid sulfate neutralizes any hydroxyl ions migrating from the cathode compartment through the cation exchange membrane and prevents them from passing to the anode compartment. The sodium acid sulfate used in this way generally is that proportion of the sodium acid sulfate by-product removed from the chlorine dioxide generator which is intended to be used as a make-up for sulfur losses in the pulp mill or for disposal.

The electrolyte used as the buffering electrolyte in the centre compartment may be mixtures of sodium chlorate and sodium sulfate, usually a sodium acid sulfate such as sodium sesquisulfate. This electrolyte subsequently may be passed from the centre compartment to the anode compartment for acidification in the manner described above, before passing to the chlorine dioxide generator. In one experiment, it was found that a solution of 1M sodium sesquisulfate and 2M sodium chlorate circulated in both anodic and centre compartments provided an acidified solution at a current efficiency of 89%.

In a further embodiment of the invention, the acidification process can be combined with another useful anodic reaction generating hydrogen ion as charge carriers crossing the ion-exchange membrane. This result can be achieved in a three-compartment cell which is equipped with two cation-exchange membranes, with the aqueous medium to be acidified being forwarded to the middle compartment.

Examples of procedures which may be effected in the compartment adjacent the anode include oxidation of sulfuric acid to form persulfuric acid, using a platinum anode, formation of other peroxy compounds, including peracetic acid, and oxidation of organic compounds, such as aldehydes to acids, in an acidic medium, such as sulfuric acid.

The anode employed in the electrolytic cell may take any desired form, but it is preferred to employ a low overpotential one with respect to the oxygen evolution reaction, for example, a DSA-$O_2$ ® electrode. Similarly, any convenient material of construction may be used for the cathode, for example, nickel.

The cation-exchange membrane may be formed of any convenient material which enables cations to selectively pass therethrough in preference to anions Preferably, the cation-exchange membrane is formed of perfluorocarbon polymer having pendant cation-exchange functional groups, such as those sold under the trademarks "NAFION" (DuPont) or "FLEMION" (Asahi Glass).

In the event an additional ion exchange membrane or membranes is used in the anode compartment, such membrane may be formed of any convenient ion-exchange material.

In one embodiment of the invention in which electrodialysis utilizing bipolar membranes is employed, the aqueous solution of a mixture of alkali metal salts is processed in a plurality of unit cells, with each unit cell being separated from the adjacent ones by bipolar membranes. The bipolar membranes have an anionic face in the base compartment of one cell and a cationic face in the acid compartment of an adjacent cell. The individual cells are divided by a cation exchange membrane.

With the plurality of cells separated by bipolar membranes, gas evolution does not take place in the acid and base compartments, and the overall reaction may be represented by the equation:

$$(x+y)\ NaClO_3 + y\ H_2O \rightarrow x\ NaClO_3 + y\ HClO_3 + y\ NaOH$$

The plurality of cells is terminated at both ends by cationic membranes. A separate electrode rinse solution, such as a sodium sulfate solution or sulfuric acid solution, is circulated between the cathodic and anodic compartments adjacent to the cathode and anode respectively. A single electrical current feed, therefore, is used to effect acidification in parallel in a plurality of unit cells, with gaseous evolution occurring only in the end anode and cathode compartments.

Bipolar membranes and their operation are well known and are described, for example, in U.S. Pat. Nos. 4,024,043, 4,180,815, 4,057,481, 4,355,116, 4,116,889, 4,253,900, 4,584,246 and 4,673,454 and reference may be had to such patents for details thereof.

If desired, the sodium sesquisulfate first may be converted by metathesis to neutral anhydrous sodium sulfate, particularly as described in copending U.S. patent application Ser. No. 07/688,438 filed Apr. 22, 1991 now U.S. Pat. No. 5,116,595 assigned to the assignee hereof and the disclosure of which is incorporated herein by reference. The neutral anhydrous sodium sulfate then can be employed as the sodium sulfate which is fed to the cell for acidification.

Such metathesis also provides an opportunity to minimize the hardness content in the saltcake used in the acidification process. Minimization of the hardness has a beneficial effect on the cell performance (i.e. current efficiency) and, in addition, it prolongs the life of the membranes used in the acidification process (both cation-exchange and bipolar). The removal of hardness from sesquisulfate or acid sulfate is a complex and costly process which typically requires neutralization of the saltcake with caustic.

By employing metathesis as described in the aforementioned application, one can not only recover the acid values from the saltcake and provide a source of sodium sulfate for the acidification process but also minimize the cost involved in adding sodium hydroxide to sesquisulfate in order to precipitate ions responsible for hardness ($Ca^{2+}$, $Mg^{2+}$, $Fe^{2+}$, $Fe^{3+}$ etc.).

The parameters of operation of the cell are not critical to the process of the invention and may vary widely. For example, the electrolytic process may be effected under any desired electrolytic conditions, generally at a membrane current density of about 0.01 to about 10 $kA/m^2$, preferably about 1 to about 5 $kA/m^2$.

Similarly, the process may be carried out over a wide range of temperatures, generally from about 0° to about 150° C, preferably from about 15° to about 90° C. Generally, higher temperatures are preferred, in view of the generally greater solubility of the alkali metal salts at higher temperatures, thereby enhancing the $[Na^+]/[H^+]$ ratio. This greater solubility at high temperature is particularly true of sodium chlorate, so that, when such salt is included in the feed to the cell, higher temperature operation, above about 60° C., is preferred. The acidified product stream from the electrolysis retains a high concentration of sodium chlorate, so that cooling of that product stream prior to passage to the chlorine dioxide generator may lead to precipitation of sodium chlorate, which can be removed and recycled to the cell feed.

As already described, one important parameter influencing current efficiency is the molar ratio of $[Na^+]/[H^+]$ in the anode compartment. Generally, this molar ratio varies from about 1000:1 to about 1:5, preferably about 1000:1 to about 1:2. Such a ratio is dependent on the concentration of the feed solution to the anode compartment and the extent to which sodium ions are transferred from the anode compartment to the cathode compartment. Accordingly, it is preferred to employ a feed solution having a concentration of about 0.1 to about 15M in sodium ions and to remove from the anode compartment for feed to the chlorine dioxide generation process an acidified solution having a concentration of about 0.1 to about 12M in sodium ions.

The electrolytic process increases the total acid normality of the alkali metal salt solution. Depending on the initial total acid normality and the degree of electrolysis effected on the feed material, it may be desirable to concentrate, such as by evaporation, the product stream to increase its total acid normality, prior to feed to the chlorine dioxide generation process. Generally, the total acid normality of the feed solution varies from about neutral to about 12 normal, preferably about 0.1 to about 10 normal, and the electrolysis is effected to such a degree as to provide a product stream from the anode compartment having a total acid normality generally from about 0.2 to about 15 normal, preferably about 0.5 to about 6 normal.

DESCRIPTION OF PREFERRED EMBODIMENTS

Figure 1:
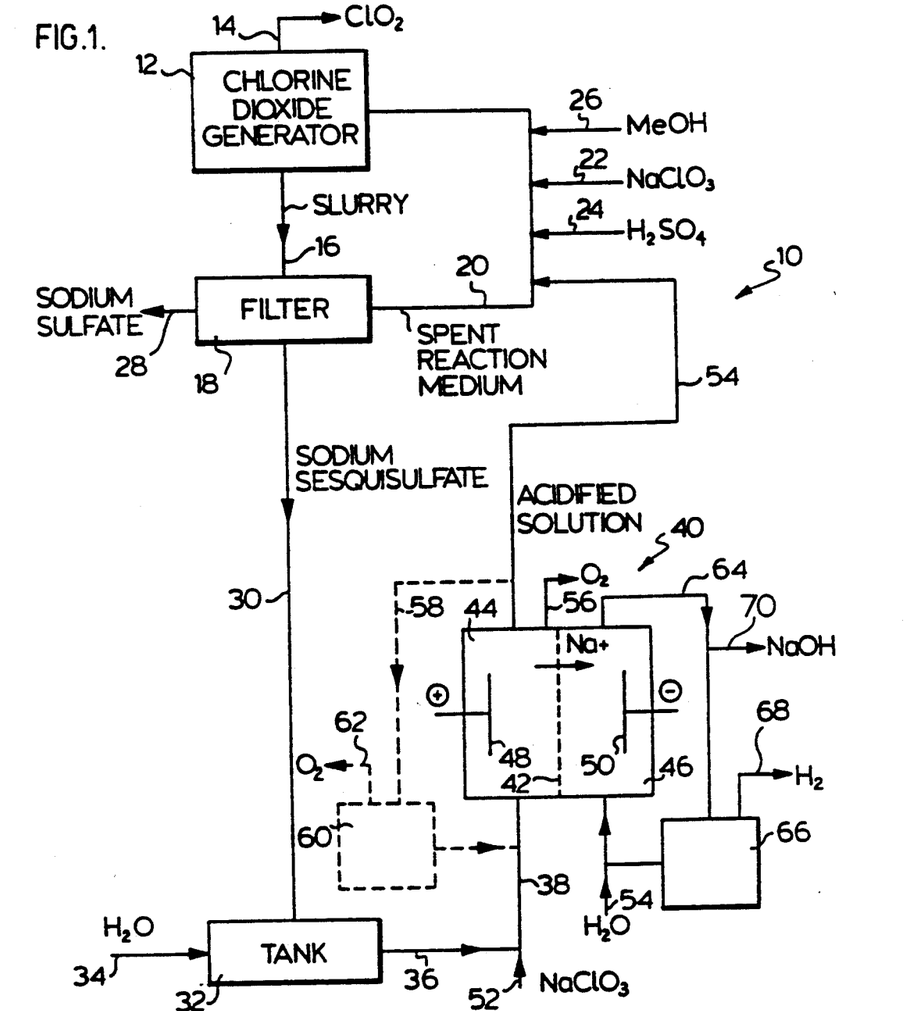
FIG. 1 is a flow sheet of a chlorine dioxide generating process provided in accordance with one embodiment of the invention.

Referring to the drawings, FIG. 1 depicts an embodiment of the application of the principles of the present invention to the production of chlorine dioxide.

There is shown therein a chlorine dioxide generating operation 10 comprising a chlorine dioxide generating process 12 wherein sodium chlorate, sulfuric acid and methanol are reacted at the boiling point of the reaction medium under a sub-atmospheric pressure, to produce gaseous chlorine dioxide in line 14 (i.e. the R8 process).

The chlorine dioxide generating process in the generator 12 results in the precipitation of a by-product sodium sulfate, once the reaction medium has become saturated after start-up. The form of the by-product sodium sulfate, namely neutral sodium sulfate, sodium sesquisulfate, sodium bisulfate or mixtures thereof, depends on the total acid normality of the reaction medium, which may vary from about 2 to about 11 normal.

The crystalline sodium sulfate (sometimes termed "saltcake") is removed from the reaction medium in the form of a slurry with spent reaction medium by line 16 and is passed to a filter wherein the crystalline material is separated from the spent reaction medium.

The separated spent reaction medium in line 20 is recycled to the generator 12 with make-up reactants, namely sodium chlorate, sulfuric acid and methanol, being fed to the recycle stream in line 20 by lines 22, 24 and 26 respectively.

The crystalline sodium sulfate separated in the filter 18 may be removed by line 28 for use elsewhere in the pulp mill in whatever proportion (including zero) of the sodium sulfate in the slurry 16 is desired.

The portion of the sodium sulfate not removed by line 28 is forwarded by line 30 to a dissolving tank 32, wherein the sodium sulfate is dissolved in water fed by line 34 to form an aqueous solution which is preferably saturated. This solution is forwarded by lines 36 and 38 to a membrane-divided electrolysis cell 40. It is not necessary that the sodium sulfate be completely dissolved in water, but may be fed as a slurry thereof. Where such a slurry is employed, it is generally desirable to isolate the anode from the slurry in the cell 40, to avoid excessive wear resulting from abrasion.

The cell 40 comprises a cation-exchange membrane 42, which divides the interior of the cell 40 into an anode compartment 44 and a cathode compartment 46 in which are located cell anode 48 and cell cathode 50 respectively.

Sodium chlorate is added to the sodium sulfate solution in line 36 by line 52 to form in line 38 a feed solution for the anode compartment 44 of the cell 40. An electrolyte is fed by line 54 to the cathode compartment 46. A current is applied between the anode 48 and the cathode 50. The sodium chlorate may be added by line 52 in the form of an aqueous solution thereof or as solid sodium chlorate.

In the cell 40, several reactions occur simultaneously. At the anode 48, water is electrolyzed to oxygen and hydrogen ion, as follows:

while at the cathode 50 water is electrolyzed to hydrogen and hydroxyl ion, as follows:

At the same time, sodium ions in the aqueous solution or slurry of a mixture of sodium sulfate and sodium chlorate migrate under the influence of the applied current from the anode compartment 44 across the cation-exchange membrane 42 to the cathode compartment 46. In effect, therefore, the electrolytically-produced hydrogen ions replace the sodium ions in the anode compartment 44 and the transferred sodium ions are available to combine with the electrolytically-produced hydroxyl ions in the cathode compartment 46.

The sodium sulfate contained in the solution feed in line 38 to the cell 40 can be considered to be a deadload circulating via the generator 12 in a closed loop, so that the overall reaction in cell 40 can be considered to be represented, as follows:

where x is the molar amount of sodium chlorate which is processed.

The resulting chloric acid-containing solution then is recycled by line 54 to the recycle line 20, to provide acid and chlorate ion for the chlorine dioxide generator 12. The proportion of sodium sulfate removed from the system by line 28 corresponds to the proportion of the sulfuric acid and sodium chlorate reactants fed to the chlorine dioxide generation from external sources, namely by line 24 for sulfuric acid and by unconverted sodium chlorate in line 24 and in line 22. Under steady state operating conditions for a process precipitating sodium sesquisulfate and where no sodium sulfate product is required, the processing of the aqueous solution of a mixture of sodium sesquisulfate and sodium chlorate in the cell 40 provides all the hydrogen ions and chlorate ions necessary to sustain the reaction and additional sulfuric acid and sodium chlorate are not required.

In effect, therefore, sodium chlorate fed to the cell 40 is converted, at least partially, to chloric acid, so that the sodium sulfate component of the feed solution 38 is a dead-load cycling between the cell 40 and the chlorine dioxide generator 12.

Oxygen is vented from the anode compartment 44 by line 56. Alternatively, the product stream may be recycled by line 58, with oxygen being vented from a gas-liquid separator 60 by line 62, wherein recycle of anolyte is required to achieve the desired acid normality of the acidified solution 54.

The sodium hydroxide produced in the cathode compartment 46 is recycled by line 64, through a gas-liquid separator 66 from which hydrogen is vented by line 68, until the desired concentration of sodium hydroxide solution is achieved. The resulting aqueous sodium hydroxide solution is removed as an aqueous product stream in line 70. This solution has considerable utility in a pulp mill, particularly as a chemical employed in the purifying and bleaching operations effected in the bleach plant of the pulp mill. The gaseous by-products, namely hydrogen and oxygen, also can be utilized in the pulp mill.

High current efficiency for the electrolytic process effected in the cell 40 as described above can be attributed to the high [Na$^+$]/[H$^+$] molar ratio in the anode compartment 44 and also to the buffering effect of SO$_4^{2-}$ ions towards hydrogen ions, which tends to maintain the free hydrogen ion concentration in the anode compartment low, thereby tending to maintain the high [Na$^+$]/[H$^+$] molar ratio.

As may be seen from the above description, the process of FIG. 1 produces chlorine dioxide by the R8 process and hence retains the benefits thereof. More importantly, the process does not produce any excess by-product sodium sulfate requiring disposal. The amount of sodium sulfate which is produced can be tailored to the mill requirement, or may be eliminated entirely. In effect, when there is no requirement for the saltcake in the pulp mill, the sodium sulfate is maintained in a closed loop within the process and the sodium ions introduced to the chlorine dioxide generating process with the sodium chlorate, exit the process in the form of aqueous sodium hydroxide solution. The acid for the chlorine dioxide generating process is produced electrolytically from water, which co-produces the hydroxyl ions required to combine with the sodium ions to form the sodium hydroxide.

Figure 2:
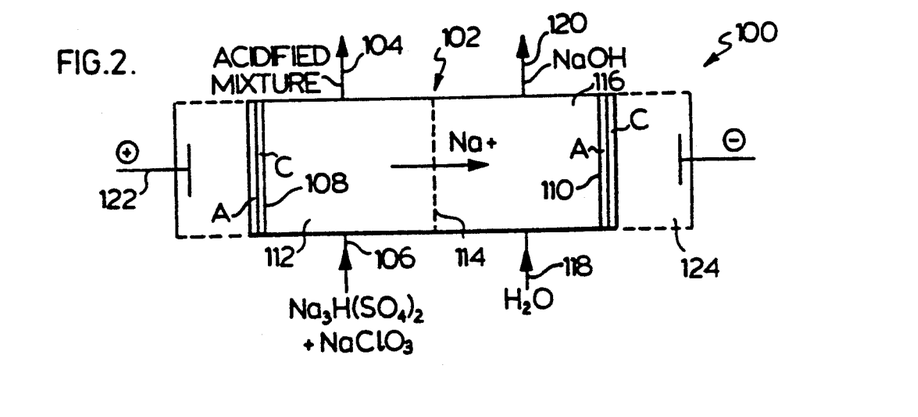
FIG. 2 is a schematic illustration of a bipolar membrane cell which may be employed with the chlorine dioxide generating process of FIG. 1.

Referring to FIG. 2, there is shown therein the utilization of a bank 100 of unit cells, with the individual cells 102 producing an acidified mixture in line 104 for feeding to a chlorine dioxide generator, as described with respect to FIG. 1, from an aqueous feed mixture of sodium sesquisulfate and sodium chlorate in line 106. The number of unit cells 102 in the bank of cells may vary widely, depending on the required production capacity and typically may vary from about 20 to about 500.

Each unit cell 100 is separated from each adjacent unit cell by bipolar membranes 108, 110. The bipolar membrane 108 has its cationic face in an acid compartment 112, so as to form hydrogen ions under the influence of the electric current applied to the bank of cells 100, thereby acidifying the feed mixture, while sodium ions are transported from the acid compartment 112 across a cation-exchange membrane 114 to a base compartment 116.

The bipolar membrane 110 has its anionic face in the base compartment 116, so as to form hydroxyl ions from the aqueous feed thereto in line 118 under the influence of the electrical current applied to the bank of cells 100. In this way, sodium hydroxide is formed in the base compartment 116 and is removed by line 120.

Only a single anode 122 and a single cathode 124 are required for the bank 100 of unit cells 102. Oxygen and hydrogen respectively are formed at the electrode surfaces and vented from the terminal unit cells.

EXAMPLES

Electrochemical experiments were carried out in a two-compartment MP cell, supplied by Electrocell AB, Sweden equipped with an oxygen-evolving anode (DSA-O$_2$ ®), nickel cathode and a cation exchange membrane (NAFION 427) dividing the cell into an anode compartment and a cathode compartment. The anode, cathode and membrane each had an area of 100 sq. cm.

In the experiments, a current density of 3 kA/m$^2$ was mainly employed (occasionally 2 kA/m$^2$), the anolyte was NaClO$_3$ or NaClO$_3$/Na$_2$SO$_4$/H$_2$SO$_4$ mixtures, the catholyte was 1N aqueous sodium hydroxide solution and the temperature was 40° to 50° C.

EXAMPLE 1

In a first set of experiments, aqueous solutions of sodium chlorate of various concentrations were used as the anolyte. During the course of electrolysis, the anolyte became enriched with hydrogen ions as the sodium chlorate was partially converted to chloric acid. Current efficiencies were determined at various product chloric acid concentrations for the various initial sodium chlorate concentrations and were plotted graphically. These results appear as FIG. 3.

Figure 3:
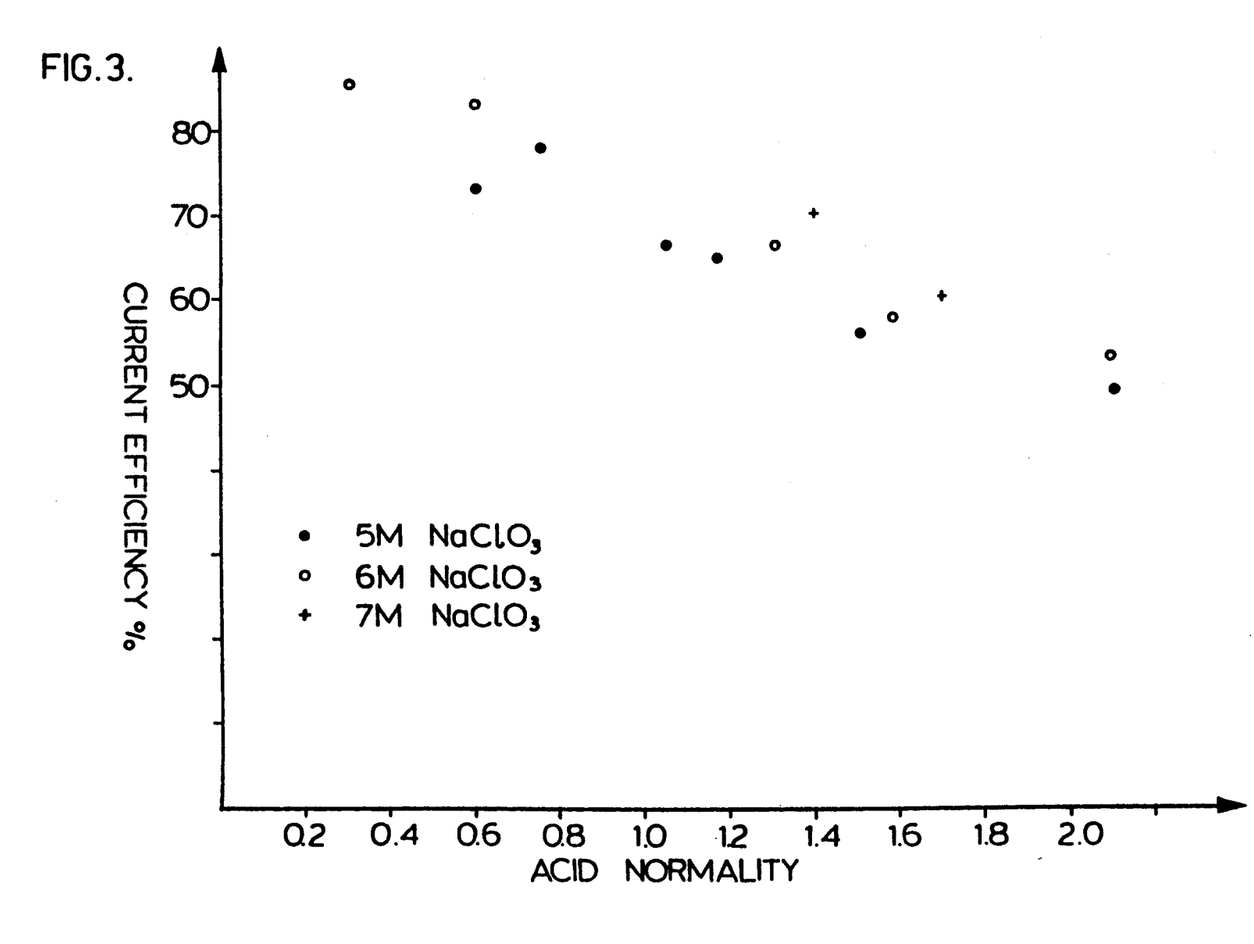
FIG. 3 contains a graphical representation of experimental data, illustrating the relationship of acid normality to current efficiency for different concentrations of alkali metal salt.

It will be seen from the data presented in this Figure that the current efficiency declines with increasing H$^+$ to Na$^+$ mole ratio in the solution electrolyzed.

EXAMPLE 2

Various mixtures of sodium chlorate and Na$_2$SO$_4$/H$_2$SO$_4$ were prepared and electrolyzed.

(a) 1 L of an approximately 2M Na$_3$H(SO$_4$)$_2$ aqueous solution was prepared by mixing Na$_2$SO$_4$ and H$_2$SO$_4$ at a molar ratio of 3:1. Acidity was measured by titration with NaOH and the solution was determined to have an initial concentration of 1.94 normal. The catholyte was 0.5L of 1N NaOH.

Current was imposed between the electrodes at a current density of 3 kA/m$^2$ and sodium chlorate crystals, in a total amount corresponding to the preparation of a 2M aqueous solution, were added slowly to the anolyte. A very rapid dissolution of sodium chlorate was observed. The increase in acidity of the anolyte was monitored by titration and the electrolysis was terminated when the acidity of the anolyte reached 4.12N. The basicity of the catholyte was determined to be 4.54N NaOH. The total time of electrolysis was 8583 seconds with the total charge passed being 257,490 A.sec.

In the calculation of the current efficiency, the volume changes of the anolyte and catholyte were taken into account, since water is transported to the catholyte together with Na$^+$ ions and also is consumed in the electrolysis. The current efficiency based on the increase in acidity of the anolyte was determined to be 79% while that based on the increase in basicity of the catholyte was 80%.

The overall conversion in the anolyte can be depicted as:

2M Na$_3$H(SO$_4$)$_2$+2M NaClO$_3$→2M Na$_3$H(SO$_4$)$_2$+2M HClO$_3$ with an equivalent amount of caustic being co-produced in the cathode compartment. Hydrogen (cathode) and oxygen (anode) were the gaseous by-products. All the reactants and products depicted by this equation are largely dissociated in the solution into the ionic species Na$^+$, H$^+$, HSO$_4^-$, SO$_4^{2-}$ and ClO$_3^-$. However, since sesquisulfate contributes a prevailing form of the precipitate formed in the chlorine dioxide generator, chloric acid (HClO$_3$=H$^+$+ClO$_3^-$) is liberated from such a mixture upon precipitation of sesquisulfate.

(b) Other mixtures of sodium chlorate and sodium sesquisulfate were processed in a similar way to that described in experiment (a), with quantitative (1 to 4) or partial (5) conversion of the sodium chlorate to chloric acid. The results obtained are reproduced in the following Table I:

TABLE I

| Reactant Expt No. | Concentrations (M) | | Acidity (N) | | Electrolysis Conditions | |
|---|---|---|---|---|---|---|
| | Sesqui | NaClO$_3$ | Initial | Final | C.D. (kA/m$^2$) | C.E. (%) |
| 1 | 2 | 1.5 | 2.01 | 3.66 | 2 | 81 |
| 2 | 1.75 | 2 | 1.81 | 3.95 | 3 | 76 |
| 3 | 1.5 | 2 | 1.48 | 3.6 | 3 | 75 |
| 4 | 1 | 2 | 1.0 | 2.9 | 2 | 63 |
| 5 | 1 | 4 | 0.92 | 2.06 | 3 | 85 |

It will be seen from this Table and the data in (a) above, that an improvement in current efficiency is obtained by the presence of sulfate ion in conjunction with a high [Na$^+$]/[H$^+$] ratio, as compared with the results obtained in Example 1. For example, 1.5M HClO$_3$ can be obtained at about 60% C.E. in pure aqueous sodium chlorate solution and at about 80% C.E. in the mixtures of sodium sesquisulfate and sodium chlorate.

EXAMPLE 3

(a) A further set of experiments was carried out with the nickel cathode used in Examples 1 and 2 replaced by a graphite cathode and the cation-exchange membrane being NAFION 417. The anolyte employed was an aqueous solution of 1M sodium sesqui-sulfate and 2M sodium chlorate and the catholyte employed was an aqueous solution of sodium sesquisulfate ranging in concentration for 0.5 to 1.5M.

The results obtained are set forth in the following Table II:

TABLE II

| Expt No. | Anolyte Acidity (N) | | Catholyte Acidity (N) | | Current Eff. (%) |
|---|---|---|---|---|---|
| | Initial | Final | Initial | Final | |
| 1 | 1.00 | 1.27 | 0.78 | 0.51 | 88 |
| 2 | 0.98 | 1.55 | 0.74 | 0.24 | 89 |
| 3 | 0.97 | 1.80 | 0.74 | −0.05* | 86 |
| 4 | 0.99 | 1.82 | 0.51 | −0.23* | 87 |
| 5 | 0.98 | 1.5 | 0.50 | 0.01 | 88 |

*the catholyte became alkaline.

As can be seen from the results of Table II, a higher current efficiency was attainable when hydroxyl ion migration is minimized, in this case by employing sodium sesquisulfate as the catholyte.

(b) An additional series of experiments was carried out in the cell described in (a) wherein 6M sodium chlorate solution was used as the anolyte and 1.5M aqueous solution of sodium sesquisulfate was used as the catholyte. Current efficiencies were determined at various product chloric acid concentrations and were plotted graphically. These results appear in FIG. 4.

Figure 4:
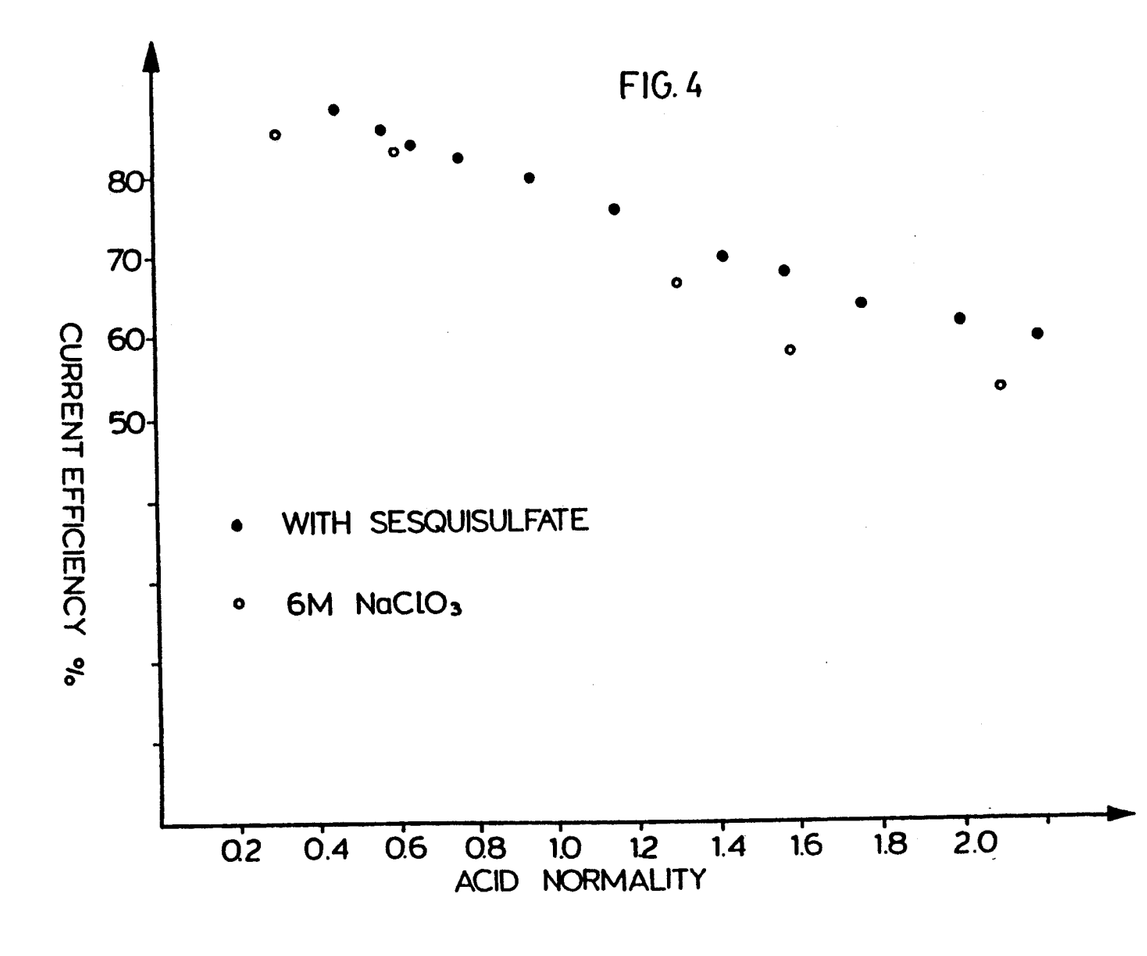
FIG. 4 contains a further graphical representation of experimental data, illustrating the relationship of acid normality to current efficiency for different catholytes.

In FIG. 4, there is also reproduced the data of FIG. 3 for 6M chlorate solutions, so that a comparison can be made. As may be seen in FIG. 4, the current efficiency declines with increasing $H^+$ to $Na^+$ mole ratio in the solution electrolyzed in both sets of data, but a higher current efficiency is achieved when sodium sesquisulfate is present in the catholyte.

EXAMPLE 4

A three-compartment cell was set up by modifying the two-compartment cell used in Examples 1 to 3 to have a second cation-exchange membrane (both NAFION 417) To the anodic compartment was fed an aqueous solution of 1M of sodium sesquisulfate and 2M of sodium chlorate, to the centre compartment was fed an aqueous solution of sodium sesquisulfate having a concentration of about 0.5 to 1.5M and to the cathode compartment was fed a 5 wt % aqueous solution of sodium hydroxide.

The results are set forth in the following Table III:

TABLE III

| Expt. No. | Duration (Min.) | Acidity Change in Anolyte (mmols of $H^+$) | Centre Compartment | | Basicity Change in Catholyte (mmols of $OH^-$) | Current Efficiency | |
|---|---|---|---|---|---|---|---|
| | | | Composition | Acidity Change (mmols of $H^+$) | | Anolyte | Catholyte |
| 1 | 185 | +3098 | 1.13 M | −265 | +2585 | 90 | 75 |
| 2 | 167 | +2755 | 1.03 M | −267 | +2410 | 88 | 77 |
| 3 | 164 | +2662 | 0.69 M | −330 | +2417 | 87 | 79 |

The results of foregoing Table III again show that a higher current efficiency was attainable when hydroxyl ion migration is minimized, in this case by employing an acid feed to a central compartment separating the anode and cathode compartments.

SUMMARY OF DISCLOSURE

In summary of this disclosure, the present invention provides a novel electrochemical process which enable the quantity of by-product sodium sulfate produced by a chlorine dioxide generating process to be decreased. Modifications are possible within the scope of this invention.

What we claim is:

1. A method for the production of an aqueous acidified chlorate ion-containing solution for use as a feed stream for a chlorine dioxide generating process wherein chlorate ions are reduced to chlorine dioxide in an aqueous acid medium, which comprises:

forming an aqueous solution of at least one alkali metal salt from solid phase alkali metal salt selected from the group consisting of alkali metal chlorate, alkali metal sulfate and mixtures of alkali metal chlorate and alkali metal sulfate, electrochemically acidifying said aqueous solution of at least one alkali metal salt, electrochemically removing alkali metal ions from said aqueous solution to produce an acidified alkali metal salt solution as said aqueous acidified chlorate ion-containing solution when said alkali metal salt is selected from the group consisting of alkali metal chlorate and mixtures of alkali metal chlorate and alkali metal sulfate, and, when said alkali metal salt is alkali metal sulfate, adding alkali metal chlorate to said acidified alkali metal salt solution to provide said aqueous acidified chlorate ion-containing solution, wherein the electrochemical steps are conducted at current efficiencies or 70% or greater.

2. The method of claim 1 wherein said electrochemical acidification of said aqueous solution of at least one alkali metal salt and electrochemical remove of alkali metal ions are effected simultaneously by:

providing an electrolytic cell comprising a cation-exchange membrane dividing said cell into an anode compartment and a cathode compartment, feeding said aqueous solution of at least one alkali metal salt to said anode compartment, electrolytically producing hydrogen ions in said anode compartment while simultaneously effecting transfer of alkali metal cations from said anode compartment through said cation-exchange membrane to said cathode compartment, and removing said acidified alkali metal salt solution from said anode compartment.

3. The method of claim 2 wherein said alkali metal sulfate is selected from neutral alkali metal sulfate, alkali metal sesquisulfate, alkali metal bisulfate and mixtures thereof.

4. The method of claim 3 wherein said alkali metal is sodium.

5. The method of claim 4 wherein said aqueous solution of at least one alkali metal salt comprises an aqueous solution of sodium sulfate and sodium chlorate.

6. The method of claim 5 wherein said sodium sulfate comprises solid phase sodium sulfate from a sulfuric acid-based chlorine dioxide generation process.

7. The method of claim 6 wherein said solid phase sodium sulfate is formed as a by-product of the chlorine dioxide generating process from sodium ions and sulfate ions fed to the process at least in part in the form of the feed stream.

8. The method of claim 7 wherein said solid phase sodium sulfate comprises sodium sesquisulfate.

9. The method of claim 5 wherein said aqueous solution of sodium sulfate and sodium chlorate contains sufficient sodium ions to provide in said anode compartment a molar ratio of [Na+]: [H+] of at least about 1000:1 to about 1:5 during said electrolytic production of hydrogen ions.

10. The method of claim 9 wherein said molar ratio of [Na+]:[H+] is about 1000:1 to about 1:2.

11. The method of claim 5 wherein said aqueous solution of sodium sulfate and sodium chlorate is saturated.

12. The method of claim 11 wherein said saturated aqueous solution is a slurry containing crystals of at least sodium sulfate.

13. The method of claim 12 wherein said anode compartment is provided with an additional separator between the anode and the feed stream.

14. The method of claim 5 wherein said electrolytic cell comprises one unit cell of a multiple number of unit cells each separated by bipolar membranes and having an anode and a cathode in terminal compartments located one at each end of the multiple member of unit cells, and said aqueous solution of sodium sulfate and sodium chlorate is fed in parallel streams to the acid compartment of each unit cell and said acidified solution is removed in parallel streams from the acid compartment of each unit cell.

15. The method of claim 14 wherein hydroxyl ions are electrolytically produced in the base compartment of each unit cell simultaneously with the electrolytic production of hydrogen ions in the acid compartment of each unit cell, and an aqueous sodium hydroxide solution is removed from each base compartment of each unit cell.

16. The process of claim 2 wherein said anode compartment contains sufficient alkali metal ions to provide a current efficiency of at least about 70% during said electrolytic production of hydrogen ions.

17. The method of claim 16 wherein said current efficiency is at least about 80%.

18. The method of claim 2 wherein said electrolytic production of hydrogen ions is effected at a membrane current density of about 0.01 to about 10 kA/m$^2$.

19. The method of claim 18 wherein said current density is about 1 to 5 kA/m$^2$.

20. The method of claim 2 wherein said acidified alkali metal salt solution is recirculated through the anode compartment until the desired acidity is achieved.

21. The method of claim 2 wherein hydroxyl ions are electrolytically produced in said cathode compartment simultaneous with said electrolytic production of hydrogen ions in said anode compartment.

22. The method of claim 21 wherein an alkali metal hydroxide solution is removed from said cathode compartment.

23. The method of claim 22 wherein said alkali metal is sodium.

24. The method of claim 23 wherein said sodium hydroxide solution is recirculated through the cathode compartment until the desired concentration of aqueous sodium hydroxide solution is produced.

25. The method of claim 21 wherein back migration of hydroxyl ions produced in said cathode compartment through said cation-exchange membrane is minimized.

26. The method of claim 25 wherein a sodium acid sulfate is fed to said cathode compartment to be at least partially neutralized by hydroxyl ions produced in said cathode compartment.

27. The method of claim 26 wherein said sodium acid sulfate comprises at least part of a by-product of a chlorine dioxide generating process.

28. The method of claim 25 wherein electrosynthesis of sodium dithionite is effected in said cathode compartment by electroreduction of bisulfite therein.

29. The method of claim 25 wherein electrosynthesis of sodium chlorite is effected in said cathode compartment by electroreduction of chlorine dioxide.

30. The method of claim 25 wherein a further cation-exchange membrane is provided in said electrolytic cell providing a central compartment between said anode compartment and said cathode compartment, and a buffering electrolyte with respect to hydroxyl ions is fed to said central compartment.

31. The method of claim 30 wherein an aqueous solution of a sodium acid sulfate is fed to said central compartment as said buffering electrolyte.

32. The method of claim 31 wherein said sodium acid sulfate comprises at least part of a by-product from the chlorine dioxide generating process.

33. The method of claim 30 wherein an aqueous solution of sodium chlorate and sodium acid sulfate is fed to said central compartment as said buffering electrolyte and subsequently is forwarded to said anode compartment.

34. The method of claim 21 wherein sodium carbonate is added to said cathode compartment to decrease the hardness of the catholyte.

35. The method of claim 1 wherein said electrochemical acidification of said aqueous solution of at least one alkali metal salt is effected by anodic hydrogen gas oxidation to hydrogen ions and addition of said hydrogen ions to said aqueous solution, and said electrochemical removal of alkali metal ions is effected by transfer of alkali metal ions from said aqueous solution across a cation-exchange ions to a recipient medium.

36. The method of claim 35 wherein cathodic electroreduction of oxygen gas is effected whereby said anodic and cathodic reactions constitute a fuel cell producing electrical energy.

37. The method of claim 35 wherein cathodic reduction of water is effected in said recipient medium to produce hydrogen and hydroxyl ions to combine with said transferred alkali metal ions to form an aqueous alkali metal hydroxide solution, and said hydrogen is fed to said anodic hydrogen gas oxidation.

38. The method of claim 1 wherein said electrochemical acidification of said aqueous solution of at least one alkali metal salt is effected by anodic oxidation of water in said aqueous solution to hydrogen ions and oxygen and said electrochemical removal of alkali metal ions is effected by transfer of alkali metal ions from said aqueous solution across a cation-exchange membrane to a recipient medium.

39. The method of claim 38 wherein cathodic electroreduction of said oxygen is effected.

40. The method of claim 1 wherein said electrochemical acidification of said aqueous solution of at least one alkali metal salt and electrochemical removal of alkali metal ions are effected simultaneously by:

providing an electrolytic cell comprising first and second cation exchange membranes dividing said cell into an anode compartment, a central compartment and a cathode compartment, feeding said aqueous solution of at least one alkali metal salt to said central compartment, electrolytically producing hydrogen ions in said anode compartment and transferring said hydrogen ions through one cation-exchange membrane to said central compartment while simultaneously effecting transfer of alkali metal cations from said central compartment through the other cation-exchange membrane to the cathode compartment, and removing said acidified alkali metal salt solution from said central compartment.

41. The method of claim 40 wherein an aqueous sulphuric acid solution is fed to said anode compartment.

42. The method of claim 40 wherein oxidation of sulfuric acid to persulfuric acid is effected in said anode compartment.

43. An electrochemical process for the treatment of an aqueous solution of a mixture of alkali metal salts comprising a mixture of alkali metal chlorate and an alkali metal sulfate, at a current efficiency of at least about 70%, which comprises:

feeding said aqueous solution to the anode compartment of an electrolytic cell having a cation exchange membrane dividing said cell into an anode compartment and a cathode compartment, electrolytically producing hydrogen ions in said anode compartment at a molar ratio of alkali metal ion to hydrogen ion of about 1000:1 to about 1:5 and hydroxyl ions in said cathode compartment while simultaneously effecting transfer of alkali metal cations from said anode compartment through said cation-exchange membrane to said anode cathode compartment, and removing an aqueous alkali metal solution from said cathode compartment and removing an acidified aqueous solution from said anode compartment, whereby back migration of hydroxyl ions produced in said cathode compartment through said cation-exchange membrane is minimized to effect said process at a current efficiency of at least about 85%.

44. The process of claim 43 wherein said molar ratio is about 1000:1 to about 1:2.

45. The process of claim 44 wherein said alkali metal sulfate is selected from the group consisting of neutral alkali metal sulfate, alkali metal sesquisulfate alkali metal bisulfate, and mixtures thereof.

46. The process of claim 45 wherein an aqueous alkali metal hydroxide solution is removed from said cathode compartment.

47. The process of claim 45 wherein an aqueous solution of a sodium acid sulfate is fed to said cathode compartment.

48. The process of claim 47 wherein said alkali metal is sodium.

49. The method of claim 50 wherein said electrochemical acidification of said aqueous solution of at least one alkali metal salt and electrochemical removal of alkali metal ions are effected simultaneously by:

providing an electrolytic cell comprising a cation-exchange membrane dividing said cell into an anode compartment and a cathode compartment;

feeding said aqueous solution to said anode compartment, electrolytically producing hydrogen ions in said anode compartment while simultaneously effecting transfer of alkali metal cations from said anode compartment through said cation-exchange membrane to said cathode compartment, and removing said acidified alkali metal salt solution from said anode compartment.

50. The method of claim 49 wherein said aqueous acid reaction medium is maintained at its boiling point while a subatmospheric pressure is applied to the reaction zone.

51. The method of claim 50 wherein said alkali metal sulfate is crystallized from said aqueous acid reaction medium in said reaction zone and is removed in crystalline form as said solid phase from said reaction zone.

52. The method of claim 51 wherein said alkali metal is sodium and chlorine dioxide is formed from said aqueous acid reaction medium by reduction of chlorate ions therein.

53. The method of claim 52 wherein said reduction is effected by feeding methanol to said reaction zone.

54. The method of claim 53 wherein said reaction medium has a total acid normality of from about 2 to about 11.

55. The method of claim 54 wherein said reaction medium has a total acid normality such that said sodium sulfate crystals comprise sodium sesquisulfate.

56. The method of claim 55 wherein at least part of said recovered sodium sesquisulfate crystals are dissolved in an aqueous medium to form an aqueous solution thereof and said latter aqueous solution provides at least part of said aqueous alkali metal salt solution feed to said anode compartment.

57. The method of claim 56 wherein said latter aqueous solution also has sodium chlorate dissolved therein prior to feed to said anode compartment.

58. The method of claim 57 wherein said latter aqueous solution comprises a slurry of said sodium sesquisulfate.

59. The method of claim 56 wherein said acidified alkali metal salt solution comprises an acidified sodium sesquisulfate solution and sodium chlorate is dissolved therein prior to feed to said reaction zone.

60. The method of claim 59 wherein the aqueous solution resulting from the addition of sodium chlorate is subjected to further electrolytic acidification prior to feed to said reaction zone.

61. The method of claim 55 wherein said crystalline sodium sesquisulfate is converted at least partially to crystalline anhydrous sodium sulfate by metathesis, said crystalline anhydrous sodium sulfate is dissolved in an aqueous medium to form an aqueous solution thereof and the latter aqueous solution provides at least part of said aqueous alkali metal salt solution feed to said anode compartment.

62. The method of claim 61 wherein said latter aqueous solution also has sodium chlorate dissolved therein prior to feed to said anode compartment.

63. The method of claim 62 wherein said latter aqueous solution comprises a slurry of said neutral anhydrous sodium sulfate.

64. The method of claim 61 wherein said acidified alkali metal salt solution comprises an acidified neutral anhydrous sodium sulfate solution and sodium chlorate is dissolved therein prior to feed to said reaction zone.

65. The method of claim 64 wherein the aqueous solution resulting from the addition of sodium chlorate is subjected to further electrolytic acidification prior to feed to said reaction zone.

66. A method for the production of chlorine dioxide, which comprises:
provided an aqueous acid chlorine dioxide-generating reaction medium containing sulfuric acid and alkali metal ions in a reaction zone,
forming an aqueous solution of at least one alkali metal salt from solid phase alkali metal salt selected from the group consisting of alkali metal chlorate, alkali metal sulfate and mixtures of alkali metal chlorate and alkali metal sulfate,
electrochemically acidifying said aqueous solution of at least one alkali metal salt,
electrochemically removing alkali metal ion from said aqueous solution to produce an acidified alkali metal salt solution,
when said alkali metal salt is selected from the group consisting of alkali metal chlorate and mixtures of alkali metal chlorate and alkali metal sulfate, forwarding said acidified alkali metal salt solution as an acidified chlorate ion-containing solution to said reaction zone to provide chlorate ion and hydrogen ion reactants to said aqueous acid chlorine dioxide-generating reaction medium,
when said alkali metal salt is alkali metal sulfate, adding alkali metal chlorate to said acidified alkali metal salt solution and then forwarding the resulting aqueous acidified chlorate ion-containing solution to said reaction zone to provide chlorate ion and hydrogen ion reactants to said aqueous acid chlorine dioxide-generating reaction medium, and
recovering from said reaction zone an alkali metal sulfate in the solid phase,
wherein the electrochemical steps are conducted at current efficiencies of 70% or greater.

67. The method of claim 66 wherein said electrochemical acidification of said aqueous solution of at least one alkali metal is effected by anodic hydrogen gas oxidation to hydrogen ions and addition of said hydrogen ions to said aqueous solution, and said electrochemical removal of alkali metal ion is effected by transfer from said aqueous solution across a cation-exchange membrane to a recipient medium.

68. The method of claim 67 wherein cathodic electroreduction of oxygen gas is effected whereby said anodic and cathodic reactions constitute a fuel cell producing electrical energy.

69. The method of claim 67 wherein cathodic reduction of water is effected in said recipient medium to produce hydrogen and hydroxyl ions to combine with said transferred alkali metal ions to form an aqueous alkali metal hydroxide solution, and said hydrogen is fed to said anodic hydrogen gas oxidation.

70. The method of claim 66 wherein said electrochemical acidification of said aqueous solution of at least one alkali metal salt is effected by anodic oxidation of water in said aqueous solution to hydrogen ions and oxygen, and said electrochemical removal of alkali metal ions is effected by transfer of alkali metal ions from said aqueous solution across a cation-exchange membrane to a recipient medium.

71. The method of claim 70 wherein cathodic electroreduction of said oxygen is effected.

72. The method of claim 70 wherein an aqueous solution of sodium acid sulfate is fed to said cathode compartment.

73. The method of claim 72 wherein said sodium acid sulfate is provided at least in part by a portion of said recovered sodium sesquisulfate.

74. The method of claim 66 wherein said electrochemical acidification of said aqueous solution of at least one alkali metal salt and electrochemical removal of alkali metal ions are effected simultaneously in an electrolytic cell comprising a first and a second cation-exchange membrane dividing the cell into an anode compartment, a central compartment and a cathodic compartment.

75. The method of claim 74 wherein:
said aqueous solution is fed to said anode compartment,
electrolytically producing hydrogen ions in said anode compartment while simultaneously effecting transfer of alkali metal ions from said anode compartment through said first cation-exchange membrane to said central compartment,
removing said acidified alkali metal salt solution from said anode compartment, and
feeding an aqueous solution of a sodium acid sulfate to said central compartment and simultaneously effecting transfer of alkali metal ions from said central compartment through said second cation-exchange membrane to said cathode compartment.

76. The method of claim 74 wherein:
said aqueous solution is fed to said central compartment,
electrolytically producing hydrogen ions in said anode compartment while simultaneously effecting transfer of hydrogen ions from said anode compartment through said first cation-exchange membrane to said central compartment and simultaneously effecting transfer of alkali metal ions from said central compartment through said second cation-exchange membrane to said cathode compartment, and
removing said acidified alkali metal salt solution from said central compartment.

* * * * *